Dec. 11, 1928.
A. G. BUSH
1,694,681
PIVOT BOLT FOR AUTOMOBILES
Filed Jan. 16, 1926
2 Sheets-Sheet 1
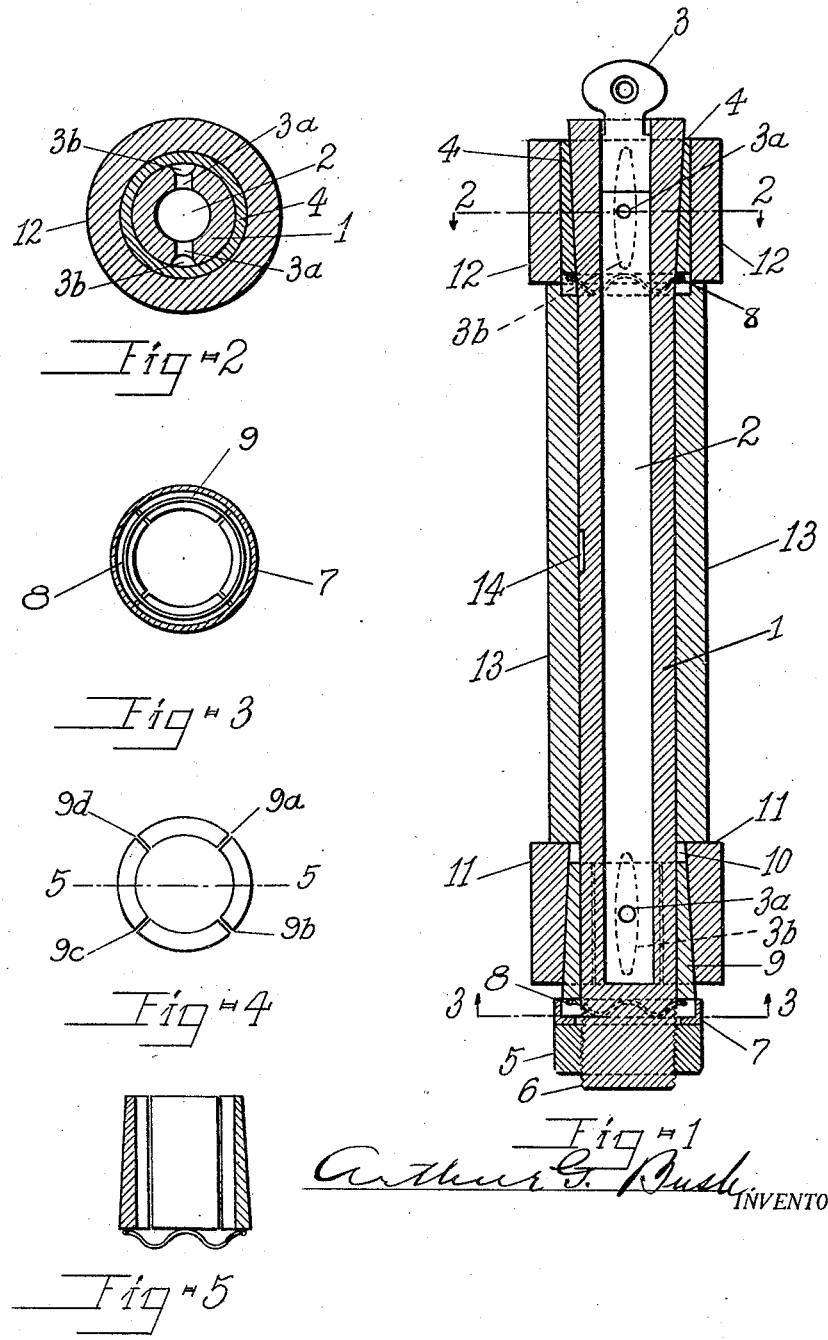

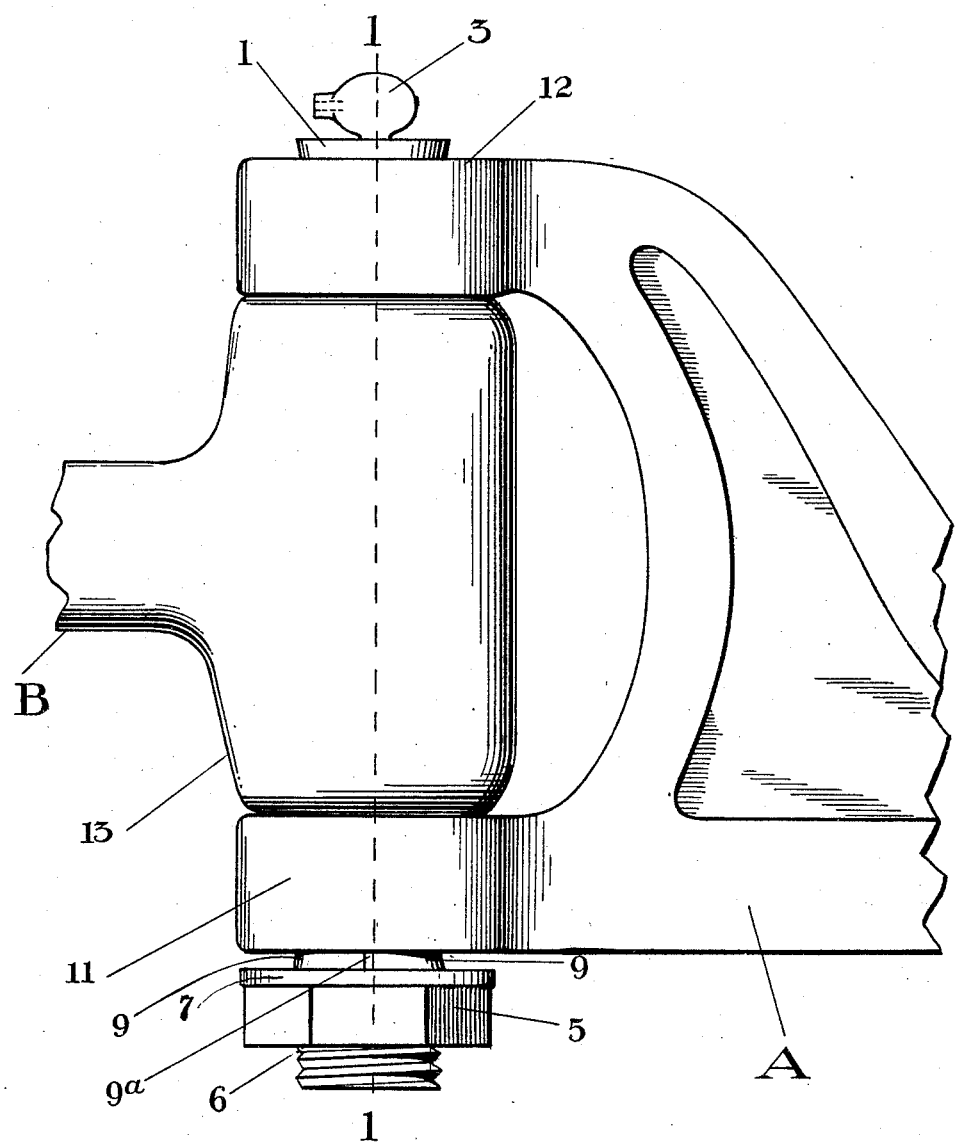

Patented Dec. 11, 1928.

1,694,681

UNITED STATES PATENT OFFICE.

ARTHUR G. BUSH, OF DAVENPORT, IOWA.

PIVOT BOLT FOR AUTOMOBILES.

Application filed January 16, 1926. Serial No. 81,819.

My invention relates to pivot bolts such as king bolts for automobiles and other purposes. By pivot bolts I refer to a bolt in which one portion of the bolt is keyed or otherwise secured to a given part of a machine and the remainder of the bolt has mounted thereon another part of the machine which is free to swing back and forth and for which the bolt acts as a pivot.

The objects of my invention are to provide appliances by which the wear upon such a bolt and its bushings may be taken up automatically or in part automatically and in part by tightening a nut thereon.

I attain these objects by the means illustrated in the accompanying drawings, in which Figure 1 is a sectional elevation of the king bolt and its attachments on the line 1—1 of Figure 6; Fig. 2 is a cross section on the line 2—2 of Figure 1; Fig. 3 is a cross section on the line 3—3 of Figure 1; Fig. 4 is a detail end view of the bushings, 9, showing the openings $9^a$, $9^b$, $9^c$ and $9^d$ between the sections thereof which should be of sufficient size to permit the tapered bushing to be driven into the tapered bearing for the desired distance without jamming; Fig. 5 is a longitudinal sectional detail of a split bushing with undulatory spring accompanying it. Figure 6 is a front elevation of one end of the front axle, A, of an automobile, with the knuckle which secures the spindle upon which the front wheel turns, in place therein, but showing the spindle, B, broken away.

In my appliance a bolt, 1, is formed with a hollow center, 2, for lubrication. The upper portion of the bolt has a downwardly tapered portion slightly longer than the bearing portion of the upper part of the yoke or fork to be pivoted thereon. An oil head, 3, with a nipple for the admission of oil, is secured in the upper end of the bolt in any of the customary ways.

The bolt, 1, is secured by a drive fit or by a key, 14, or other suitable means in a knuckle, 13, which is recessed at its upper end to provide a seat for an undulatory spring, 8. A tapered bushing, 4, is mounted within the yoke bearing, 12, surrounding the bolt, 1, with its thicker end bearing upon the undulatory spring, 8, which acts to force the bushing upwardly and against the taper of the bolt, 1.

The lower end of the bolt is provided with a tapered bushing, 9, which is preferably formed in a plurality of segments with slight openings, $9^d$, between the segments. This bushing, 9, has mounted upon the outer face thereof the lower end of the yoke, which in this case I have numbered 11. The lower end of the yoke is internally tapered to correspond with the taper of the bushing, 9. Oil holes, $3^a$ are formed near both ends of the bolt which conduct oil from the hollow or oil chamber, 2, through the bolt and into longitudinal grooves, $3^b$, formed in the outer face of the bolt, so as to afford a ready passage for oil from the hollow head, 3, to the bearing portions of the bolt upon which the yoke swings back and forth.

At the lower end of the bolt, a cap, 7, is secured, the internal diameter of which is the same as the external diameter of the bushing, 9, and this cap affords a seat for an undulatory spring, 8.

The lower end of the bolt is threaded to receive a nut, 5, and this nut may be a castellated nut locked in place by a spring key or secured by a star washer or any other of the well-known means for that purpose now in common use or an additional lock nut may be added if desired. The upper end of the bolt, 1, may be in hexagonal form or may be provided with any other suitable means by which it may be secured against turning while tightening the nut, 5, or the upper end may be simply held with a pair of pliers. Neither the locking means for the nut, 5, nor the particular means for holding the bolt, form an essential part of my invention, but any of the common devices in use for such purposes may be utilized.

In the operation of my device as applied to the king or spindle body bolt of an automobile, the knuckle, 13, and the parts, 11 and 12, of the yoke, are placed in juxtaposition and properly aligned. The bolt, 1, is then driven into place through the upper end, 12, of the yoke and firmly seated in the knuckle, 13, and secured, if desired, by a key or any other means which will allow a small amount of vertical travel.

Before inserting the bolt, 1, in the knuckle, 13, the upper spring, 8, should be placed in its seat and the bushing, 4, seated thereon.

After the bolt has been driven home, the bushing, 9, should be put in place and secured by the cap, 7, and lower spring, 8, the cap and spring being secured in turn by the nut, 5. The nut, 5, should then be tightened sufficiently to exert the desired pressure upon the springs, 8.

It is obvious that as the bushings, 4 and 9, or the bolt, wears, the action of the spring will force the tapered bushings upwardly so as to take up any slack that may be produced by such wear and whenever sufficient wear has occurred so that the slack relieves the tension upon the springs, 8, the nut, 5, may be tightened so as to register the desired tension.

In the case of king bolts for automobiles, for instance, a very small amount of wear of one or two hundredths of an inch, will produce sufficient play to cause the front wheels to "shimmy" or wobble to a disagreeable extent and such wear will readily and automatically be taken up by my appliance.

I do not limit my invention to king bolts for it is applicable to a great many different uses where it is desired to take up play in a bolt in a shaft. It may be applied to bearings for grinding wheels where a grinding wheel is secured upon a shaft corresponding to the bolt, with lateral bearings on each side thereof. It may be applied with slight modifications of the heads of the springs, to springs for automobiles and it is obviously applicable to a multitude of other uses.

When applied to springs, the bolts should be rigidly secured to the middle portion of the spring head or joint, which may be considerably shortened, and the forked portion of the head should be lengthened to form an extended bearing.

When applied to springs, the bolt may be tapered as shown in Figure 1 or both ends of the bolt may be made straight to correspond to the lower end of the bolt in Figure 1 and the bushings applied to both ends as in the lower end of Figure 1. In the case of springs it is obvious that the greater part of the wear comes at the top and bottom of the bearings as they lie in a horizontal position. In order to take up the uneven wear thus caused, the bushings should be split into four or more segments or sections as shown in Figure 4 and the spring so formed that at least one bend would come into contact with and exert pressure upon each separate segment.

The ends, 11 and 12, of the yoke, are ordinarily rigidly secured in place by being formed integral with the axle of the automobile, thus leaving the bolt, 1, free to turn within the bushings, 4 and 9, for the purpose of steering the car.

It is obvious that the yoke bearings, 11 and 12, may be replaced by a fixed shaft and bearing or other suitable bearing and a wheel be mounted upon the bolt, 1, in place of the knuckle, 13, being mounted thereon and the wear between the shaft and the bushings taken up in the way heretofore described.

It is also obvious that instead of tapering the inside of the yoke end, 11, the lower end of the bolt may be externally tapered and the bushings be internally tapered to take up the wear.

While I have referred to the upper and lower ends of the bolt in these specifications, I have used those terms merely as applied to Figure 1 of the drawings. It is obvious that my invention is applicable to bolts or shafts fixed in a horizontal or other position as well as those secured in a vertical position.

When a drive fit is used to secure the bolt in the knuckle, 13, the bolt, 1, can be tapped lightly to drive it a little further into the knuckle and equalize the tension of the upper and lower springs and prevent an excess pressure of the lower spring. When the bolt 1, is secured in the knuckle, 13, by a key or spline, it should be fitted loosely enough to allow the spring pressures to equalize themselves.

I have shown a preferred form of my invention but it is obvious that one or both ends of the bolt may be tapered outwardly and internally tapered bushings used in connection therewith and all the wear between the bolts and bushings be taken up by springs, caps and adjusting nuts as at the lower end of Fig. 1, without departing from the scope of my invention.

It is also apparent that the degree of taper of the bolt, bushings or seat may be varied to any degree necessary to prevent too tight a joint, and that a very slight taper and a short movement of the parts will be sufficient to take up ordinary wear.

While the form of bolt shown in the drawings is preferred for installation in the original manufacture of cars, I prefer to use for repair and replacement purposes a bolt having its upper end as well as its lower end fitted with the form and arrangement of parts shown at the lower end of Figure 1, retaining, however, the oiling means shown at the top of Figure 1. When this arrangement is used at both ends, the ends of the bolt should be grooved to permit the bolt to be held by a screw driver or key while the nuts are being adjusted thereon.

I claim:

1. A pivot bolt having a tapered head and straight body and mounting therefor comprising a central knuckle firmly secured to the bolt, a yoke pivoted upon the ends of the bolt, a tapered bushing mounted upon the tapered head of the bolt and within the upper end of the yoke, the lower end of the yoke being tapered internally and forming a seat for an externally tapered bushing which is mounted upon the lower end of the bolt, and means which exert pressure upon the tapered bushings to secure them in close contact with the tapered head and tapered seat respectively.

2. A pivot bolt having a tapered head and straight body and mounting therefor comprising a central knuckle firmly secured to the bolt, a yoke pivoted upon the ends of the bolt, a tapered bushing mounted upon the tapered head of the bolt and within the upper end of the yoke, the lower end of the yoke being tapered internally and forming a seat for an externally tapered bushing which is mounted upon the lower end of the bolt, means which exert pressure upon the tapered bushings to secure them in close contact with the tapered head and tapered seat respectively, and adjustable means secured upon the lower end of the bolt to adjust the tension of the first mentioned means.

3. A pivot bolt having a tapered head and straight body and mounting therefor comprising a central knuckle firmly secured to the bolt, a yoke pivoted upon the ends of the bolt, a tapered bushing mounted upon the tapered head of the bolt and within the upper end of the yoke, the lower end of the yoke being tapered internally and forming a seat for an externally tapered bushing which is mounted upon the lower end of the bolt, means which exert pressure upon the tapered bushings to secure them in close contact with the tapered head and tapered seat respectively, and a nut threaded upon one end of the bolt engaging a cap mounted upon the bolt and adapted to vary the tension upon the first mentioned means.

4. A pivot bolt having a tapered head and straight body and mounting therefor comprising a central knuckle firmly secured to the bolt, a yoke pivoted upon the ends of the bolt, a tapered bushing mounted upon the tapered head of the bolt and within the upper end of the yoke, the lower end of the yoke being tapered internally and forming a seat for an externally tapered bushing which is mounted upon the lower end of the bolt, and springs suitably seated surrounding the bolt adjacent the bushings and operating to drive the tapered bushings into closer contact with the tapered head of the bolt and the tapered seat respectively.

5. A pivot bolt having a tapered head and straight body and mounting therefor comprising a central knuckle firmly secured to the bolt, a yoke pivoted upon the ends of the bolt, a tapered bushing mounted upon the tapered head of the bolt and within the upper end of the yoke, the lower end of the yoke being tapered internally and forming a seat for an externally tapered bushing which is mounted upon the lower end of the bolt, springs suitably seated surrounding the bolt adjacent the bushings and operating to drive the tapered bushings into closer contact with the tapered head of the bolt and the tapered seat respectively, and adjustable means secured to the bolt adapted to vary the tension upon the springs.

6. A pivot bolt having a tapered head and straight body and mounting therefor comprising a central knuckle firmly secured to the bolt, a yoke pivoted upon the ends of the bolt, a tapered bushing mounted upon the tapered head of the bolt and within the upper end of the yoke, the lower end of the yoke being tapered internally and forming a seat for an externally tapered bushing which is mounted upon the lower end of the bolt, springs suitably seated surrounding the bolt adjacent the bushings and operating to drive the tapered bushings into closer contact with the tapered head of the bolt and the tapered seat respectively, and a nut threaded upon the bolt operating to vary the tension upon the springs.

In testimony whereof he affixes his signature.

ARTHUR G. BUSH.